US010587605B2

(12) United States Patent
Mistry

(10) Patent No.: US 10,587,605 B2
(45) Date of Patent: *Mar. 10, 2020

(54) CERTIFICATE PINNING IN HIGHLY SECURE NETWORK ENVIRONMENTS USING PUBLIC KEY CERTIFICATES OBTAINED FROM A DHCP (DYNAMIC HOST CONFIGURATION PROTOCOL) SERVER

(71) Applicant: Citrix Systems, Inc., Fort Lauderdale, FL (US)

(72) Inventor: Shaunak Mistry, Scotts Valley, CA (US)

(73) Assignee: Citrix Systems, Inc., Fort Lauderdale, FL (US)

(*) Notice: Subject to any disclaimer, the term of this patent is extended or adjusted under 35 U.S.C. 154(b) by 196 days.

This patent is subject to a terminal disclaimer.

(21) Appl. No.: 15/628,107

(22) Filed: Jun. 20, 2017

(65) Prior Publication Data
US 2018/0367530 A1 Dec. 20, 2018

(51) Int. Cl.
H04L 29/00 (2006.01)
H04L 29/06 (2006.01)
H04L 29/12 (2006.01)

(52) U.S. Cl.
CPC ...... *H04L 63/0823* (2013.01); *H04L 61/2015* (2013.01); *H04L 65/1069* (2013.01);
(Continued)

(58) Field of Classification Search
CPC ............. H04L 63/0823; H04L 65/1069; H04L 61/2015; H04L 63/10; H04L 63/08;
(Continued)

(56) References Cited

U.S. PATENT DOCUMENTS 8,677,466 B1 3/2014 Chuang et al.
2009/0037997 A1 2/2009 Agbabian et al.
(Continued)

FOREIGN PATENT DOCUMENTS

EP 1361694 A2 * 11/2003 ....... H04L 29/12009
EP 1361694 A2 11/2003
GB 2359969 A * 9/2001 ............. G06F 21/31

OTHER PUBLICATIONS

Cooper et al., "Internet X.509 Public Key Infrastructure Certificate and Certificate Revocation List (CRL) Profile", Network Working Group, Standards Track, RFC 5280, May 2008, The IETF Trust (2008), 135 pages.
(Continued)

Primary Examiner — Jeffrey C Pwu
Assistant Examiner — Helai Salehi
(74) Attorney, Agent, or Firm — BainwoodHuang

(57) ABSTRACT

Technology for providing secure communications between a user device and a secure server, in which a user device performs a certificate pinning operation by requesting and receiving a set of public key certificates for the secure server from a dynamic host configuration protocol (DHCP) server. The user device requests and receives a current public key certificate of the secure server from the secure server. The current public key certificate of the secure server is compared with the set of public key certificates for the secure server received from the DHCP server. In response to the current public key certificate of the secure server matching one of the public key certificates in the set of public key certificates for the secure server received from the DHCP server, the authenticity of the secure server is confirmed and communications are permitted between the user device and the secure server.

22 Claims, 5 Drawing Sheets

(52) U.S. Cl.
CPC .............. *H04L 63/04* (2013.01); *H04L 63/08* (2013.01); *H04L 63/10* (2013.01); *H04L 63/12* (2013.01)

(58) Field of Classification Search
CPC ....... H04L 63/04; H04L 63/12; H04L 9/3263; H04L 9/3265; H04L 9/3268; H04L 29/06775; H04L 2209/64
See application file for complete search history.

(56) References Cited

U.S. PATENT DOCUMENTS

| | | | |
|---|---|---|---|
| 2014/0283054 | A1 | 9/2014 | Janjua et al. |
| 2016/0063466 | A1 | 3/2016 | Sheridan et al. |
| 2017/0054708 | A1* | 2/2017 | Zaw ................... H04L 63/0823 |
| 2017/0195299 | A1* | 7/2017 | James ................ H04L 63/0442 |
| 2017/0346853 | A1* | 11/2017 | Wyatt .................... H04L 43/12 |

OTHER PUBLICATIONS

Dierks et al., "The TLS Protocol, Version 1.0", Network Working Group, Standards Track, RFC 2246, Jan. 1999, The Internet Society (1999), 72 pages.

Dierks et al., "The Transport Layer Security (TLS) Protocol, Version 1.2", Network Working Group, Standards Track, RFC 5246, Aug. 2008, The IETF Trust (2008) 104 pages.

Evans et al., "Public Key Pinning Extension for HTTP", Internet Engineering Task Force (IETF), Google, Inc., RFC 7469, ISSN: 2070-1721, Standards Track, Apr. 2015, 28 pages.

Turner et al., "Prohibiting Secure Sockets Layer (SSL) Version 2.0", NIST, RFC 6176, Internet Engineering Task Force, ISSN: 2070-1721, Standards Track, Mar. 2011, 4 pages.

Alexander et al., "DHCP Options and BOOTP Vendor Extensions", Network Working Group, Standards Track, RFC 2132, Mar. 1997, 31 pages.

Droms, R., "Dynamic Host Configuration Protocol", Network Working Group, Standards Track, RFC 2131, Mar. 1997, 45 pages.

"Domain Name System", Wikipedia, Internet Engineering Task Force (Internet standards), Jan. 7, 2016, pp. 1-18, «https://en.wikipedia.org/wiki/Domain_Name_System» Article was retrieved on Mar. 16, 2017.

Jiawen Su, et al., "Certificate Pinning Using a Directory Service," U.S. Appl. No. 15/019,118, filed Feb. 9, 2016.

Hu, Z. et al., "TLS for DNS: Initiation and Performance Considerations draft-hzhwm-dprive-start-tls-for-dns-02," Internet Engineering Task Force (IETF), Standard Working Draft, Internet Society (ISOC) 4, Rue Des Falaises CH-1205, Geneva, Switzerland, Apr. 15, 2015, 15 pages.

Notification of Transmittal of the International Search Report and the Written Opinion of the International Searching Authority, or the Declaration, International Searching Authority, International Application No. PCT/US2018/034868, International Filing Date: May 29, 2018, mailed from International Searching Authority dated Aug. 27, 2018, 16 pages.

* cited by examiner

CERTIFICATE PINNING IN HIGHLY SECURE NETWORK ENVIRONMENTS USING PUBLIC KEY CERTIFICATES OBTAINED FROM A DHCP (DYNAMIC HOST CONFIGURATION PROTOCOL) SERVER

TECHNICAL FIELD

The present disclosure relates generally to the technical field of cyber security in networked computer systems, and more specifically to a public key certificate pinning system that is operable in highly secure network environments and that performs certificate pinning using public key certificates obtained from a DHCP (Dynamic Host Configuration Protocol) server.

BACKGROUND

As it is generally known in the areas of cryptography and computer security, a man-in-the-middle attack is an attack in which a malicious entity (e.g. compromised networking device, malicious software module, etc.) secretly relays and possibly alters communications between two entities that believe they are communicating directly with each other. One example of a man-in-the-middle attack is active eavesdropping, in which the malicious entity makes independent connections with the communicating computer systems, and selectively relays messages between the systems to make them believe they are communicating directly with each other over a private connection, while in fact the entire communication session is being controlled and potentially modified by the attacker. To accomplish this, an attacker must be able to intercept all relevant messages passing between the two systems, and to also inject new messages. Performing such message interception and injection may be straightforward under many circumstances.

Existing cryptographic protocols include forms of endpoint authentication that are specifically intended to prevent man-in-the-middle attacks. For example, the TLS (Transport Layer Security) protocol and its predecessor the SSL (Secure Sockets Layer) protocol include authentication of one or both communicating entities within a public key infrastructure (PKI), using a mutually trusted certificate authority (CA). In addition to these techniques, some client-server environments have also provided what is generally referred to as "certificate pinning", in which the client attempts to avoid a man-in-the-middle attack by comparing a previously obtained certificate to a certificate that is subsequently obtained from the same server, and then allowing communication with the server only when there is a match between the two certificates.

Operation of user devices in highly secure networked environments introduces specific challenges with regard to performing effective certificate pinning. Some highly secure organizations may, while certain operations are performed or at all times, prevent access to data resources that are outside of their physical control, e.g. that are located outside the physical premises of the organization. In some cases, an organization may require that a user device be disconnected from all external networks at certain times, e.g. while a highly sensitive operation is being performed. In other cases, the organization may prevent data that is used during the highly sensitive operation from being stored on any server that is located on a network that is not under the control of the organization. In either case, certificate pinning in networked environments of such highly secure organizations must often be performed using only resources that are within the organization's physical control.

One example of a highly sensitive operation is enrollment of a user device with an organization's Mobile Device Management (MDM) system. As it is generally known, an MDM system enables the organization to monitor, manage and user devices, including mobile devices, potentially across multiple mobile service providers and multiple operating systems. An MDM system enforces policies and controls the operation of mobile and other user devices that are enrolled with the MDM system. MDM systems are capable of providing the organization with end-to-end security, so that mobile applications, network(s) and/or data that are used by an enrolled device, as well as the enrolled device itself, are all managed by the MDM system. After a user device has been enrolled with the organization's MDM system, the device is considered "sanitized", and the user of the enrolled device may be permitted to access the organization's private resources (e.g. hardware resources such as servers and/or communication networks, software resources such as databases, applications, etc.) through the enrolled mobile device. A successful man-in-the-middle attack performed during the MDM system enrollment process for a user device may compromise what is sometimes referred to as the "control path" (e.g. a secure connection) between the MDM system and the user device, by establishing a malicious entity that intercepts control messages between the MDM system and the user device, unbeknownst to either the MDM system or the device. The malicious entity may intercept and acknowledge control messages sent from the MDM system to the user device, causing the MDM system to believe that the control messages have been successfully received by and performed on the user device, when in fact the messages were never delivered to the device. For example, when an employee leaves the organization, the MDM may send a "scrub" command or the like to the employee's mobile device that, if received and executed properly on the device, would cause the device to delete all the private data that it stores, and also prevent the device from performing any subsequent accesses to the organization's private resources. If the malicious entity intercepts the scrub message sent by the MDM and prevents delivery of the scrub message to the user device, and also sends a fake acknowledgement to the MDM system erroneously indicating that the scrub message was successfully delivered to the user device, the device may continue to access the organization's private resources even after the employee has left the organization, and without the knowledge of the organization.

SUMMARY

Technology for providing secure communications between a user device and a secure server in a highly secure networked environment, in which a certificate pinning operation is performed at least in part by i) requesting, by the user device from a dynamic host configuration protocol (DHCP) server, a set of public key certificates for the secure server, ii) receiving, by the user device from the DHCP server, the set of public key certificates for the secure server, and iii) storing the set of public key certificates for the secure server within the user device. A certificate request operation is performed by i) requesting, by the user device from the secure server, a current public key certificate of the secure server, ii) receiving, by the user device from the secure server, the current public key certificate of the secure server, and iii) storing the current public key certificate of the secure server within the user device. The current public key certificate of the secure server that is received from the secure server is compared with the set of public key certificates for the secure server that is received from the DHCP server. In response to the current public key certificate of the secure server received from the secure server matching one of the public key certificates in the set of public key certificates for the secure server received from the DHCP server, the authenticity of the secure server is confirmed and communications are permitted between the user device and the secure server.

In another aspect, performing the certificate pinning operation may further include detecting, by the user device prior to requesting the set of public key certificates for the secure server from the DHCP server, that the set of public key certificates for the secure server is not available from a directory service. The directory service stores multiple sets of public key certificates, and is located separately and operates independently from the DHCP server. The user device may request the set of public key certificates for the secure server from the DHCP server in response to detecting that the set of public key certificates for the secure server is not available from the directory service.

In another aspect, detecting that the set of public key certificates for the secure server is not available from a directory service that stores multiple sets of public key certificates may include i) the user device sending a request for the public key certificates for the secure server from the user device to the directory service, the request for the public key certificates for the secure server sent to the directory service including a domain name associated with the secure server, and ii) the user device receiving a response from the directory service, the response indicating that the directory service does not store the set of public key certificates for the domain name associated with the secure server.

In another aspect, detecting that the set of public key certificates for the secure server is not available from the directory service may further include determining that the user device cannot currently communicate with the directory service.

In another aspect, subsequent communications between the user device and the secure server may be prevented unless the current public key certificate received from the secure server matches one of the public key certificates in the set of public key certificates for the secure server received by the user device from the DHCP server.

In another aspect, requesting the set of public key certificates for the secure server from the DHCP server may include sending a request message, from the user device to the DHCP server, the request message requesting both i) the set of public key certificates for the secure server, and ii) an internet protocol (IP) address for use by the user device. Receiving the set of public key certificates for the secure server may then include receiving, by the user device from the DHCP server, a message containing both i) an IP address assigned to the user device by the DHCP server, and ii) the set of public key certificates for the secure server.

In another aspect, the request message sent from the user device to the DHCP server message requests both i) the set of public key certificates for the secure server, and ii) the internet protocol (IP) address for use by the user device may be a DHCP discover message, and the message received by the user device from the DHCP server that contains both i) the IP address assigned to the user device by the DHCP server and ii) the set of public key certificates for the secure server may be a DHCP offer message, and the user device may extract both the IP address assigned to the user device by the DHCP server and the set of public key certificates for the secure server from the received DHCP offer message.

In another aspect, the request message sent from the user device to the DHCP server message requesting both i) the set of public key certificates for the secure server, and ii) the internet protocol (IP) address for use by the user device may be a DHCP request message, and the message received by the user device from the DHCP server that contains both i) the IP address assigned to the user device by the DHCP server and ii) the set of public key certificates for the secure server may be a DHCP acknowledge message, and the user device may extract both the IP address assigned to the user device by the DHCP server and the set of public key certificates for the secure server from the received DHCP acknowledge message.

In another aspect, the certificate pinning operation may initially be performed by the user device prior to communicating with the secure server, to obtain an initial set of public key certificates for the secure server, and the certificate request operation may initially be performed by the user device in response to completion of the initial certificate pinning operation, to obtain a first current public key certificate of the secure server. Subsequent communications between the user device and the secure server may then be prevented unless the first current public key certificate received from the secure server matches one of the public key certificates in the initial set of public key certificates for the secure server received from the DHCP server, by preventing establishment of a secure connection between the user device and the secure server.

In another aspect, the set of public key certificates for the secure server may be received by the DHCP server from the directory service, and the set of public key certificates for the secure server may include a digital signature generated by the directory service using a private key of the directory service. The user device may include a user agent that includes an embedded copy of the a public key of the directory service, and the user device may use the public key of the directory service embedded in the user agent to validate the set of public key certificates for the secure server that is received by the user device from the DHCP server based on the digital signature included in the set of public key certificates for the secure server.

In another aspect, the user device may be a mobile device, and the secure server may include a mobile device management system. The mobile device management system may be under the control of an organization that has one or more protected resources (e.g. that are accessible only through a private network), and the communications between the user device and the secure server may enroll the user device with the mobile device management system. Enrolling the user device with the mobile device management system may cause the user device to be managed by the mobile device management system, and also enable the user device to access the protected resources of the organization.

BRIEF DESCRIPTION OF THE DRAWINGS

The foregoing and other objects, features and advantages will be apparent from the following description of particular embodiments, as illustrated in the accompanying drawings in which like reference characters refer to the same parts throughout the different views. The elements of the drawings are not necessarily drawn to scale, emphasis instead being placed upon illustrating the principles of the various embodiments.

DETAILED DESCRIPTION

Figure 1:
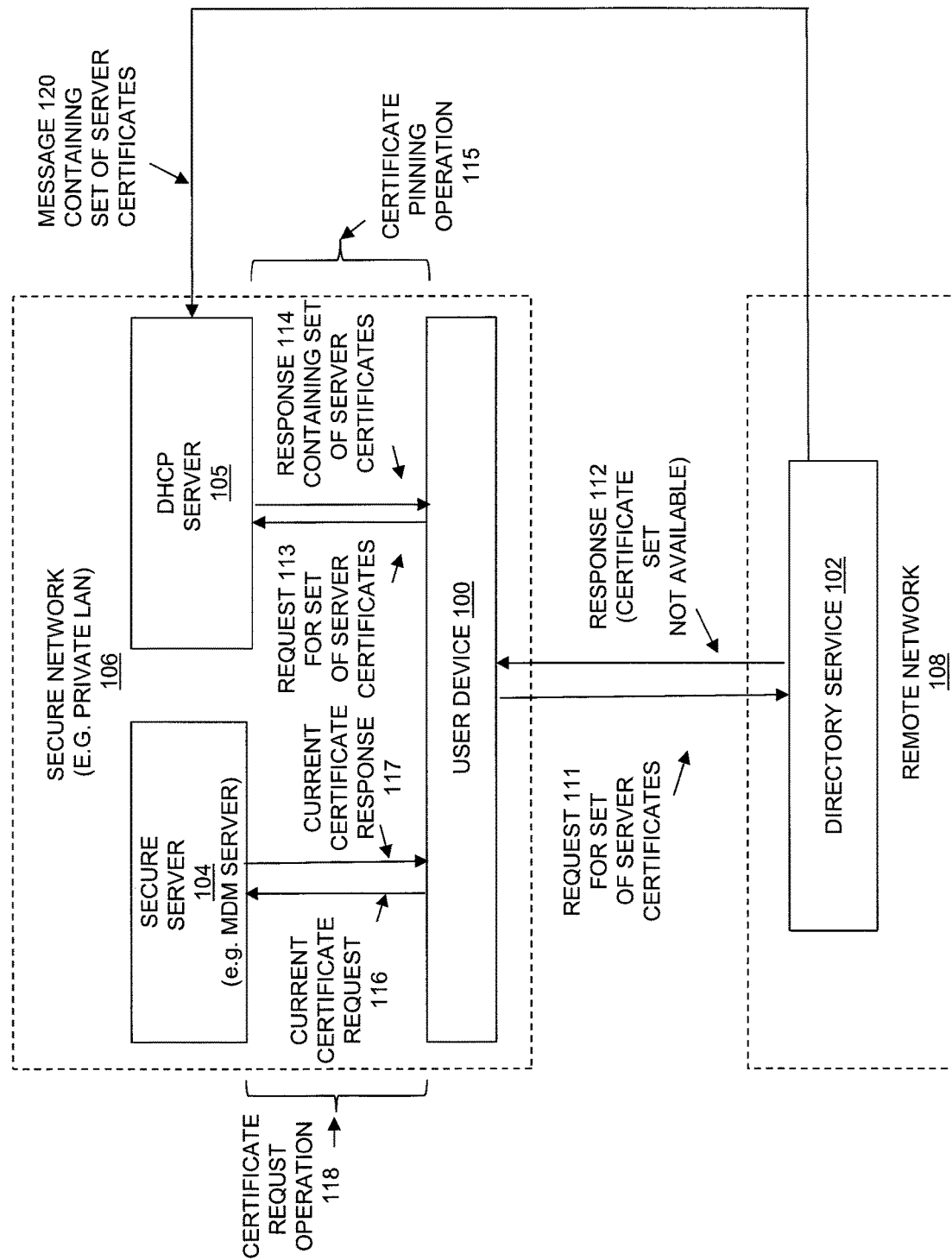
FIG. 1 is a block diagram showing an example of components in some illustrative embodiments.

Embodiments will now be described with reference to the figures. Such embodiments are provided only by way of example to illustrate various features and principles. The scope of the claims is not limited to the examples of specific embodiments described herein.

The individual features of the particular embodiments, examples, and implementations described herein can be combined in any manner that makes technological sense. Such features are hereby combined to form all possible combinations, permutations and variants except to the extent that such combinations, permutations and/or variants have been explicitly excluded or are technically impractical. Support for all such combinations, permutations and variants is considered to exist in this document.

Previous technologies for preventing man-in-the-middle attacks using certificate pinning have had significant shortcomings. For example, some user devices have performed certificate pinning by obtaining a public key certificate of a server from a directory service that is separate and independent from the server to which secure communication is desired, and by then using that public key certificate to validate a public key certificate subsequently received from the server. However, when a user device operates in a highly secure networked environment that prevents access to resources that are outside an organization's physical control while certificate pinning is being performed, and the directory service is not under the organization's physical control (e.g. is provided externally in the "cloud"), the directory service cannot be used by the user device during the certificate pinning operation. Under such circumstances, it is undesirable for the user device to communicate with the highly secure organization's servers without the protection against man-in-the-middle attacks provided by certificate pinning, even though a public key certificate to be used for certificate pinning cannot be obtained from the external directory service. However, simply performing certificate pinning using a public key certificate that is initially obtained directly from the secure server has required that the user device rely on a root certificate of a certificate authority to validate the initial public key certificate that is received from the server. Such approaches are problematic, since existing user devices can be made to load and trust a fraudulent root certificate that is provided by an attacker (e.g. through a "phishing" attack, compromised memory card, etc.), thus enabling the attacker to launch an undetected man-in-the-middle attack between the user device and the server based on an invalid public key certificate provided by the entity performing the man-in-the-middle attack.

To address these and other shortcomings of previous certificate pinning technologies, new technology is described herein for providing secure communications between a user device and a secure server, in which a set of public key certificates for the secure server are obtained by the user device from a Dynamic Host Control Protocol (DHCP) server, and then compared to a current public key certificate of the secure server obtained from the secure server. Communications are permitted between the user device and the secure server in response to the current public key certificate of the secure server matching one of the public key certificates in the set of public key certificates for the secure server that was received from the DHCP server.

The technology provides significant advantages over previous solutions. The technology enables the user device to detect and prevent man-in-the-middle attacks when operating in a highly secure networked environment, in which certificate pinning must be performed using only resources that are within a specific organization's physical control, e.g. that are located within the organization's internal private local area network (LAN). In such a secure environment, the technology described herein advantageously obtains a set of public key certificates for a secure server from a DHCP server that is located within the secure environment, even when an external directory service that would otherwise provide the public key certificate of the secure server cannot be used, either because the user device cannot communicate with the directory service from within the secure environment, or because the organization does not permit storage of public key certificates of the secure server on the external directory service. In some embodiments, the set of public key certificates for the secure server that is obtained from the DHCP server may be digitally signed using a private key of the directory service, and loaded from the directory service to the DHCP server, and a copy of a public key of the directory service that is embedded into the user device may then safely be used to validate the set of public keys received from the DHCP server. Such an approach advantageously avoids reliance by the user device on a potentially fraudulent root certificate of a certificate authority to validate the public key certificates for the secure server. As a result, man-in-the-middle attacks may be effectively detected by the user device even when a fraudulent root certificate has been loaded into the user device.

In some embodiments, the set of public key certificates for the secure server may be received from the DHCP server within the same message that is used to convey an IP address to the user device from the DHCP server (e.g. a DHCP offer message or a DHCP acknowledge message), thus advantageously eliminating any need for the additional network traffic that would otherwise result if a separate, dedicated message was used to convey the set of public key certificates from the secure server to the user device.

In some embodiments, the disclosed technology may advantageously provide secure communications between a user device and a secure Mobile Device Management (MDM) server, e.g. while the user device is being enrolled with the MDM server. In such embodiments the technology advantageously detects and prevents man-in-the-middle attacks within a control path between the user device and the MDM server. Protection against man-in-the-middle attacks within the control path between the user device and the MDM server is especially desirable in secure network environments that rely on an MDM system to protect private resources, since a successful man-in-the-middle attack within the control path between the user device and the MDM server may prevent delivery of critical control messages transmitted by the MDM server to the user device, e.g. a scrub message that is intended to cause the user device to delete all private data stored on the mobile device and prevent further access to the organization's private resources. In this way the disclosed technology may advantageously prevent unauthorized accesses by the user device to the private resources of an organization that relies on an MDM system to protect its private resources.

FIG. 1 is a block diagram showing an example of components in an illustrative embodiment of technology for providing secure communications between a user device and a secure server, e.g. between User Device 100 and Secure Server 104. User Device 100 may consist of or include any specific type of computer or computerized device, including but not limited to a desktop computer, laptop computer, or tablet computer, or a computerized handheld device such as a smartphone or personal digital assistant. User Device 100 may further include and execute various specific types of software, including but not limited to user agent software that acts as a client entity when the User Device 100 communicates with Secure Server 104. Such user agent software may, for example, be embodied in whole or in part as a Web browser program, or another specific type of client software. During operation of the disclosed technology, User Device 100 is communicably connected to a number of other devices in a secure private communication network, shown in FIG. 1 by Secure Network 106.

Secure Network 106 may, for example, consist of or include a private Local Area Network (LAN), such as an Ethernet or Wi-Fi based private LAN, or some other type of secure communication network that may be located completely within the physical premises (e.g. within one or more buildings, etc.) of an organization (e.g. a business or governmental entity) that owns and/or controls Secure Network 106 as well as various private resources of the organization that are communicably connected by and/or accessible through Secure Network 106. Such private resources may include or consist of computing, communication and/or storage devices, as well as some amount of private data that is stored on such devices (e.g. in one or more databases), and/or applications and/or other types of software executing on one or more server computers or the like that are communicably connected to Secure Network 106.

Secure Server 104 is also connected to Secure Network 106, and may be embodied as one or more physical server computer systems. Secure Server 104 may further include application server software that is stored in and executes on processing circuitry in Secure Server 104. Such application server software may include one or more Web applications and/or Web servers that provide server functionality for a client-server distributed application that is provided at least in part by Secure Server 104. Any specific type of application or service may be provided by Secure Server 104.

In some embodiments, Secure Server 104 includes Mobile Device Management (MDM) server software that is stored in and executes on Secure Server 104. Such MDM server software manages various types of user devices (e.g. User Device 100) that belong to members (e.g. employees) of the organization that provides Secure Network 106. In order for a user device such as User Device 100 to access one or more of the private resources that are connected to Secure Network 106, the user device must go through an enrollment operation and become enrolled with the MDM server. During the enrollment operation, the user device may be prevented from accessing any devices that are not directly connected to Secure Network 106. In other words, the user device may be communicably connected to some or all of Secure Network 106 during the enrollment operation, but lack any connectivity to resources located on any other computer or communication network. For example, in the case of a user device that has cellular telephony capabilities, such capabilities may be automatically or manually disabled while the user device is being enrolled with the MDM server, in order to prevent the user device from accessing potentially unsecure devices that are located outside of Secure Network 106 during the enrollment operation.

DHCP Server 105 may be embodied as one or more physical server computer systems that are communicably connected to Secure Network 106, and is operable to assign a different Internet Protocol (IP) address (e.g. from a private IP address space associated with Secure Network 106) to each one of the various devices that are communicably connected to Secure Network 106, including Secure Server 104 and User Device 100. DHCP Server 105 operates at least in part based on the DHCP network protocol that is generally used on IP networks to distribute IP addresses. DHCP Server 105 also stores a set of one or more public key certificates for Secure Server 104. Each public key certificate in the set of public key certificates for Secure Server 104 is an electronic document that contains a public key of a public/private key-pair assigned to Secure Server 104. As stored in DHCP Server 105, each public key certificate in the set of public key certificates for Secure Server 104 is also associated with a domain name corresponding to Secure Server 104. The public key of a public key certificate for Secure Server 104, and/or other information contained in the certificate, may be used by User Device 100 to establish a secure communication channel with Secure Server 104, for example using the Transport Layer Security (TLS) protocol or its predecessor the Secure Sockets Layer (SSL) protocol to establish a secure connection between the User Device 100 and Secure Server 104. For example, in some embodiments, such a secure connection between User Device 100 and Secure Server 104 may be established during an enrollment operation between User Device 100 and an MDM server executing on Secure Server 104, and then used subsequent to successful completion of the enrollment operation to securely convey control messages sent from the MDM server in Secure Server 104 to User Device 100.

Directory Service 102 may include or consist of one or more server systems (e.g. one or more physical server computer systems, virtual private servers (VP Ss), cloud servers, etc.) that are physically separate from and/or operate independently with regard to any of the servers located on Secure Network 106. Accordingly, Directory Service 102 may include or consist of one or more server systems that have physical locations that are remote from the physical locations of any of the servers on Secure Network 106.

In some embodiments, each public key certificate referred to herein, including each public key certificate that is i) stored within and/or obtained from the DHCP Server 105, ii) stored within and/or obtained from Secure Server 104, iii) stored within and/or obtained from Directory Service 105, iv) stored within and/or obtained by User Device 100, and/or v) stored within and/or obtained from Directory Service 102, may be a public key certificate conforming to the format specified by the X.509 standard for public key infrastructure (PKI). See for example "Internet X.509 Public Key Infrastructure Certificate and Certificate Revocation List (CRL) Profile", Request for Comments 5280, D. Cooper, S. Santesson, S. Farrell, S. Boeyen, R. Housley, W. Polk, May 2008, all disclosures of which are hereby included by reference herein.

Each public key certificate for Secure Server 104 that is stored by the DHCP Server 105 and provided to User Device 100 may include a digital signature that can be used by the User Device 100 to validate the certificate. For example, each public key certificate stored by DHCP Server 105 and provided to User Device 100 may be digitally signed by Directory Service 102 using a private encryption key that is uniquely assigned to and securely stored within Directory Service 102. In such embodiments, the User Device 100 can validate each public key certificate received from DHCP Server 105 using a public key of the Directory Service 102 that is embedded into User Device 100, e.g. that is hard-coded in user agent software that is loaded into and executes on User Device 100.

During operation of the illustrative embodiment shown in FIG. 1, as part of providing secure communications between User Device 100 and Secure Server 104, the User Device 100 performs at least one certificate pinning operation, as illustrated in FIG. 1 by Certificate Pinning Operation 115. The Certificate Pinning Operation 115 includes User Device 100 transmitting a request message to DHCP Server 105 to obtain a set of one or more public key certificates for Secure Server 104, as shown by Request 113. The Certificate Pinning Operation 115 also includes User Device 100 receiving a response message that is transmitted from DHCP Server 105, and that contains a set of one or more public key certificates for Secure Server 104, as shown by Response 114. The Certificate Pinning Operation 115 further includes User Device 100 storing the set of public key certificates for Secure Server 104 received from DHCP Server 105 in Response 114 within User Device 100.

The Request 113 transmitted from User Device 100 to DHCP Server 105 may include an indication, such as an address, name, or other identifier, that uniquely identifies Secure Server 104. For example, Secure Server 104 may correspond to a domain name. A domain name corresponding to Secure Server 104 may, for example, identify a mobile device management (MDM) application or the like that executes on Secure Server 104, and that User Device 100 must enroll with in order to gain access to private resources located on Secure Network 106. Accordingly, Request 113 may contain a domain name corresponding to Secure Server 104 (or to the MDM application provided by Secure Server 104) to indicate that Request 113 is a request for the set of public key certificates for Secure Server 104. DHCP Server 105 may then respond to receipt of Request 113 by using the domain name contained in Request 113 to search a certificate set database contained in DHCP Server 105, in order to retrieve the set of one or more public key certificates for Secure Server 104 from the certificate set database. DHCP Server 105 then transmits the retrieved set of public key certificates for Secure Server 104 to User Device 100, e.g. within Response 114.

In some embodiments, Request 113 may be a message requesting both i) the set of public key certificates for Secure Server 104, and ii) an internet protocol (IP) address for use by the user device. In such embodiments, the Response 114 may be a message containing both i) an IP address assigned to the User Device 100 by the DHCP Server 105, and ii) the set of public key certificates for Secure Server 104. For example, Request 113 may be a DHCP discover message, and Response 114 may be a DHCP offer message. In embodiments in which Request 113 is embodied as a DHCP discover message, User Device 100 may load a domain name corresponding to Secure Server 104 into an options portion of the DHCP discover message to indicate to DHCP Server 105 that the set of public key certificates being requested by Request 113 is the set of public key certificates for Secure Server 104. In embodiments in which Response 114 is embodied as a DHCP offer message, DHCP Server 105 may operate in response to receipt of a DHCP discover message containing the domain name of Secure Server 104 by storing the set of public key certificates for Secure Server 104 into an options portion of the DHCP offer message prior to transmitting the DHCP offer message to User Device 100. User Device 100 may then extract both i) the IP address assigned to the User Device 100 by the DHCP Server 105, and ii) the set of public key certificates for Secure Server 104, from the DHCP offer message when it is received by User Device 100.

In another example, Request 113 may be a DHCP request message, and Response 114 may be a DHCP acknowledge message. In embodiments in which Request 113 is embodied as a DHCP request message, User Device 100 may load a domain name corresponding to Secure Server 104 into an options portion of the DHCP request message to indicate to DHCP Server 105 that the set of public key certificates being requested is the set of public key certificates for Secure Server 104. In embodiments in which Response 114 is embodied as a DHCP acknowledge message, DHCP Server 105 may operate in response to receipt of a DHCP request message containing the domain name of Secure Server 104 by storing the set of public key certificates for Secure Server 104 into an options portion of the DHCP acknowledge message prior to transmitting the DHCP acknowledge message to User Device 100. User Device 100 may then extract both the IP address assigned to the User Device 100 by the DHCP Server 105, and the set of public key certificates for Secure Server 104, from the DHCP acknowledge message when it is received by User Device 100.

Formats of DHCP discover, offer, request and acknowledge messages are described in "Dynamic Host Configuration Protocol", IETF Request for Comments 2131, R. Droms, Bucknell University, published in March, 1997, all disclosures of which are hereby included by reference herein.

Further with regard to the Certificate Pinning Operation 115, when User Device 100 receives Response 114 from DHCP Server 105, and extracts the set of public key certificates for Secure Server 104 from Response 114, User Device 100 then stores the set of public key certificates for Secure Server 104 in User Device 100, for example within a certificate set data store that is contained in User Device 100. The set of public key certificates for Secure Server 104 may, for example, be stored in a certificate database contained in User Device 100 in association with the domain name corresponding to Secure Server 104. In embodiments in which Response 114 includes an IP address assigned to User Device 200 by DHCP Server 105, in response to receipt of Response 114 User Device 100 may also i) extract the IP address assigned to User Device 100 by DHCP Server 105 from Response 114, ii) store the IP address assigned to User Device 100 by DHCP Server 105 within User Device 100, and iii) begin using the IP address assigned to User Device 200 by DHCP Server 105 as its IP address when communicating with other devices using the TCP/IP (Transmission Control Protocol/Internet Protocol) suite of communication protocols. IP packets subsequently transmitted from User Device 100 include the IP address assigned to User Device 100 by DHCP Server 105 as a source address, and IP packets having the IP address assigned to User Device 100 by DHCP Server 105 as a destination address may subsequently be routed to and successfully received by User Device 100.

User Device 100 may include and execute user agent software that is used to access the Secure Server 104, the DHCP Server 105, and the Directory Service 102. The user agent software may include an embedded (i.e. hard-coded) public key certificate of the Directory Service 102, that can only be modified or replaced by loading a new version of the user agent software into User Device 100. Accordingly, whenever the public key of Directory Service 102 changes, the user agent software in the User Device 100 must be updated to a new version, where the new version of the user agent software has the new public key certificate of Directory Service 102 embedded therein.

In some embodiments, the user agent software in User Device 100 may use the public key from the public key certificate of Directory Service 102 that is embedded within User Device 100 to validate each one of the public key certificates in the set of public key certificates for Secure Server 104 received from DHCP Server 105, based on a digital signature generated by Directory Service 102 that is contained in each public key certificate in the set of public key certificates for Secure Server 104 that is received from DHCP Server 105. User Device 100 may operate to discard any received public key certificate that cannot be validated based on the digital signature that it contains, and any discarded public key certificate cannot subsequently be compared with, or be determined to be a match with any current public key certificate of Secure Server 104 (e.g. as extracted from Current Certificate Response 117).

Prior to generation of Response 114 by DHCP Server 105, the set of public key certificates for Secure Server 104 may be received by DHCP Server 105 from Directory Service 120, e.g. in a Message 120 that is transmitted from Directory Service 102 and that contains the set of public key certificates for Secure Server 104. For example, Message 120 may be transmitted from Directory Service 102 in response to receipt by Directory Service 102 of a system administration file transfer command sent to Directory Service 102 from a system administration computer system that is communicably connected to Remote Network 108. The command sent to Directory Service 102 may specifically indicate that the set of public key certificates for Secure Server 104 is to be copied from the Directory Service 102 to the DHCP Server 105. For example, Directory Service 102 may store multiple sets of public key certificates for multiple servers, and each set of public key certificates stored in Directory Service 102 may be associated with a corresponding domain name. The command received by Directory Service 102 from a system administration computer system that causes Directory Service 102 to transmit Message 120 to DHCP Server 105 may include i) the domain name of Secure Server 104, and ii) a name or other identifier of DHCP Server 105, and iii) an indication that the set of public key certificates stored in Directory Service 102 and associated with the domain name of Secure Server 104 is to be copied to DHCP Server 105. Prior to transmission of Message 120 to DHCP Server 105, Directory Service 102 may digitally sign each one of the public key certificates in the set of public key certificates for Secure Server 104, using a private key of a key pair that is uniquely associated with Directory Service 102, such that each one of the public key certificates in the set of public key certificates for Secure Server 104 includes a digital signature generated using the private key of Directory Service 102.

In some embodiments, Certificate Pinning Operation 115 may further include detecting, by User Device 100 prior to transmitting Request 113 to DHCP Server 105, that the set of public key certificates for Secure Server 104 is not available from Directory Service 102. In some embodiments, User Device 100 may transmit Request 113 to DHCP Server 105 in response to detecting that the set of public key certificates for Secure Server 104 is not available from Directory Service 102.

For example, User Device 100 may detect that the set of public key certificates for Secure Server 104 is not available from Directory Service 102 by i) transmitting a Request 111 from User Device 100 to Directory Service 102, the Request 111 including the domain name associated with Secure Server 104 and requesting that Directory Service 102 transmit the set of public key certificates associated with the domain name associated with Secure Server 104 to the User Device 100, and ii) receiving Response 112 from Directory Service 102, the Response 112 indicating that the Directory Service 102 does not store a set of public key certificates associated with the domain name associated with Secure Server 104. For example, such operation may arise in an operational environment in which the Directory Service 102 is located outside of the Secure Network 106, such as on Remote Network 108, which may be a remote network that is external to Secure Network 106, and the organization operating Secure Network 106 may prevent the public key certificates for Secure Server 104 from being stored on any device located outside of Secure Network 106. In such a case, when Request 111 is received at Directory Service 102, Directory Service 102 may respond by transmitting a Response 112 to User Device 100 indicating that a set of public key certificates associated with the domain name for Secure Server 104 is not stored in Directory Service 102.

In another example, User Device 100 may detect that the set of public key certificates for Secure Server 104 is not currently available from Directory Service 102 by determining that User Device 100 cannot currently communicate with Directory Service 102. For example, determining that User Device 100 cannot currently communicate with Directory Service 102 may include User Device 100 transmitting or attempting to transmit a request for the set of public key certificates for the Secure Server 104 (e.g. Request 111) to Directory Service 102, and subsequently receiving an error message or the like indicating that the Directory Service 102 is not reachable from User Device 100. For example, such a case may also arise in an operational environment in which the Directory Service 102 is located outside of the Secure Network 106, such as on Remote Network 108, which may be a remote network that is external to Secure Network 106. User Device 100 and/or other devices on Secure Network 106 may be automatically or manually prevented from accessing devices outside of Secure Network 106 at all times, or while one or more highly sensitive operations are performed. One example of a highly sensitive operation is enrollment of a user device such as User Device 100 with a Mobile Device Management (MDM) server, and Secure Server 104 may be embodied to include an MDM server. For example, preventing User Device 100 from accessing devices outside of Secure Network 106 may include automatically or manually disabling cellular network access from the User Device 100 while the user device is being enrolled with the MDM server. Accordingly, detecting that User Device 100 cannot currently communicate with Directory Service 102 may at least in part include detecting that User Device 100 cannot currently access devices outside of Secure Network 106, e.g. by detecting that cellular network access for User Device 100 has been disabled.

Subsequent to and/or in response to completion of the Certificate Pinning Operation 115, the disclosed technology performs Certificate Request Operation 118. During Certificate Request Operation 118, User Device 100 requests, from the Secure Server 104, a current public key certificate of Secure Server 104, e.g. by transmitting Current Certificate Request 116 to Secure Server 104. Certificate Request Operation 118 further includes the User Device 100 receiving, from the Secure Server 104, the current public key certificate of the Secure Server 104, and the User Device 100 storing the current public key certificate of the Secure Server 104 within the User Device 100.

In some embodiments, User Device 100 may perform Certificate Request Operation 118 with regard to Secure Server 104 by sending a Current Certificate Request 116 including or consisting of a TLS "Client Hello" message to Secure Server 104, as part of the process of establishing or attempting to establish a TLS connection with Secure Server 104, for example during an enrollment operation with an MDM server executing on Secure Server 104, so that a TLS connection can subsequently be used to securely convey control messages transmitted from the MDM server to the User Device 100 after the enrollment operation is successfully completed. In response to receipt of the "Client Hello" message, Secure Server 104 transmits its current public key certificate to User Device 100, e.g. within Current Certificate Response 117. A description of the "Client Hello" message in the TLS protocol may be found in "The Transport Layer Security (TLS) Protocol)", Version 1.2, Request for Comments 5246, T. Dierks and E. Rescorla, August 2008, all disclosures of which are hereby included herein by reference.

In response to receipt of the current public key certificate of Secure Server 104 from Secure Server 104, User Device 100 compares the current public key certificate of Secure Server 104 with a validated set of public key certificates for Secure Server 104 that was previously received from DHCP Server 105. Note that any one or more of the public key certificates in the set of public key certificates for Secure Server 104 that was previously received from DHCP Server 105, but that User Device 100 could not validate using the public key of Directory Service 102, based on at least one digital signature contained in the set of public key certificates, would have been previously discarded by User Device 100 based on a lack of a valid digital signature, and is therefore not compared with the current public key certificate of Secure Server 104.

For example, the User Device 100 may perform the comparison between the current public key certificate of the Secure Server 104 that it received from the Secure Server 104 to each one of the certificates from the set of public key certificates for Secure Server 104 that it received from the DHCP Server 105 by comparing the public key information of the current public key certificate of the Secure Server 104 to the public key information of each one of the certificates from the set of public key certificates for Secure Server 104. In embodiments in which the public key certificates are X.509 certificates, such a comparison may, for example, be performed by comparing the output of a hash algorithm applied to the public key information in the current public key certificate of the Secure Server 104 with the output of the same hash algorithm applied to the public key information in each public key certificate from the set of public key certificates for Secure Server 104 that was previously received from the DHCP Server 105. If the hash algorithm outputs match, then there is a match between the certificates. For example, such a comparison may be performed between the current public key certificate of the Secure Server 104 and each one of the certificates in the set of certificates for the Secure Server 104 that was previously received from the DHCP Server 105 using "PIN Validation" as described in "Public Key Pinning Extension for HTTP", Request for Comments 7469, ISSN: 2070-1721, C. Evans, C. Palmer, R. Sleevi, April 2015, all disclosures of which are hereby included herein by reference.

In response to the current public key certificate of the Secure Server 104, as received from Secure Server 104, matching one of the public key certificates in the set of public key certificates for Secure Server 104 received from the DHCP Server 105, the authenticity of the server is confirmed by User Device 100, and communications between User Device 100 and Server 104(1) are permitted by User Device 100. For example, User Device 100 may allow establishment of a secure TLS channel between User Device 100 and Secure Server 104, over which device management control messages and/or HTTP (HyperText Transfer Protocol) communications may be communicated between User Device 100 and Secure Server 104 in response to the current public key certificate of the Secure Server 104 matching one of the public key certificates in the set of public key certificates for Secure Server 104 that was previously received from the DHCP Server 105.

In some embodiments, User Device 100 may be a mobile device, and the Secure Server 104 may include an MDM server that is under the control of an organization that owns one or more protected resources that are only accessible only through Secure Network 106. In such embodiments, the communications between the User Device 100 and the Secure Server 104 that are permitted in response to the current public key certificate of the Secure Server 104 matching a certificate from the set of public key certificates for Secure Server 104 received from the DHCP Server 105 may include one or more messages communicated between User Device 100 and Secure Server 104 that are exchanged during an enrollment operation that enrolls the User Device 100 with the MDM server executing on the Secure Server 104, as well as control messages issued by the MDM server to the User Device 100 after User Device 100 is enrolled with the MDM server. Enrolling the User Device 100 with the MDM server causes the User Device 100 to be managed by the MDM server, and also enables the User Device 100 to access the protected resources of the organization that are accessible only through Secure Network 106.

In some embodiments, User Device 100 may operate to prevent subsequent communications between the User Device 100 and the Secure Server 104 in response to detecting that the current public key certificate of Secure Server 104 that was received from Secure Server 104 does not match any of the public key certificates in the set of public key certificates for Secure Server 104 that was received from DHCP Server 105. For example, in response to detecting that the current public key certificate of Secure Server 104 matches none of the public key certificates for Secure Server 104 in the set of public key certificates for Secure Server 104 that was received from DHCP Server 105, the User Device 100 may prevent any subsequent communications between User Device 100 and Secure Server 104. Preventing subsequent communications between User Device 100 and Secure Server 104 may, for example, include User Device 100 tearing down any previously established secure connection (e.g. TLS connection) that exists between User Device 100 and Secure Server 104, and/or User Device 100 preventing the subsequent establishment of a new secure connection (e.g. TLS connection) between User Device 100 and Secure Server 104.

User Device 100 may initially perform the Certificate Pinning Operation 115 prior to any communication with Secure Server 104, in order to detect any attempted first use man-in-the-middle attacks. For example, User Device 100 may perform an initial certificate pinning operation with regard to Secure Server 104 prior to establishing or using a secure connection (e.g. TLS connection) with Secure Server 104, in order to obtain an initial set of public key certificates for Secure Server 104 from DHCP Server 105. User Device 100 may further initially perform Certificate Request Operation 118 with Secure Server 104 in response to completion of the initial certificate pinning operation with regard to Secure Server 104, in order to obtain a first current public key certificate of Secure Server 104 from Secure Server 104 prior to any other communications being performed between User Device 100 and Secure Server 104, e.g. prior to establishing any secure connection and/or communicating over any secure connection (e.g. a TLS connection) between User Device 100 and Secure Server 104. User Device 100 may then prevent subsequent communications between User Device 100 and Secure Server 104 unless the first current public key certificate received from Secure Server 104 matches one of the public key certificates in the initial set of public key certificates for Secure Server 104 that was received from the DHCP Server 105, for example by i) preventing the establishment of an initial secure connection between User Device 100 and Secure Server 104, ii) tearing down a previously established secure connection between User Device 100 and Secure Server 104, or ii) preventing the subsequent establishment of a secure connection (e.g. TLS connection) between User Device 100 and Secure Server 104.

Figure 2:
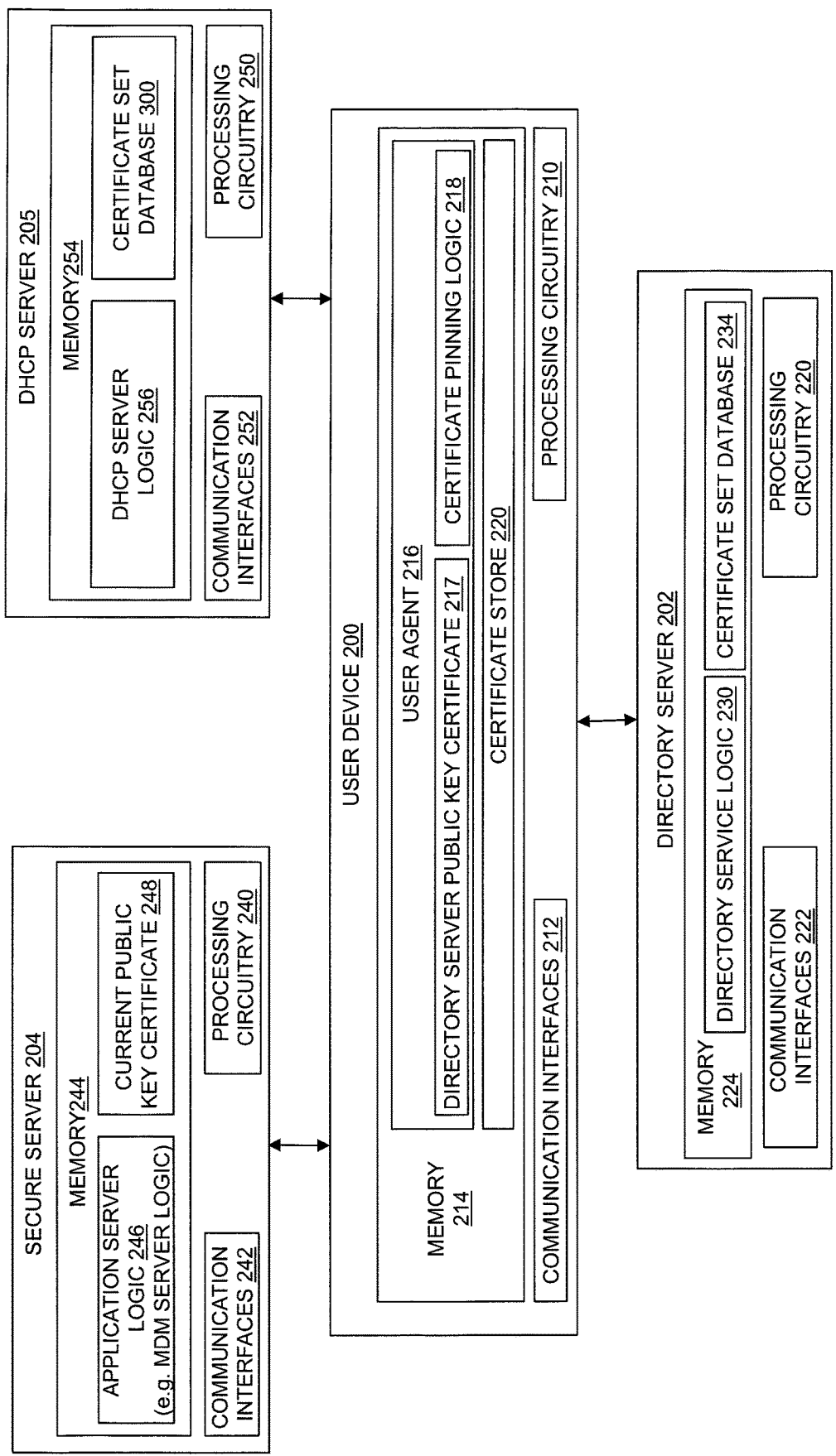
FIG. 2 is a block diagram showing another example of components in some illustrative embodiments.

FIG. 2 is a block diagram showing an example of components in an illustrative embodiment of the disclosed system. FIG. 2 shows a User Device 200, Directory Server 202, Secure Server 204, and DHCP Server 205. User Device 200 is an example of an embodiment of the User Device 100 shown in FIG. 1, Directory Server 202 is an example of an embodiment of the Directory Service 102 shown in FIG. 1, Secure Server 204 is an example of an embodiment of the Secure Server 104 shown in FIG. 1, and DHCP Server 205 is an example of an embodiment of the DHCP Server 105 shown in FIG. 1. Each of the User Device 200, Directory Server 202, Secure Server 204, and DHCP Server 205 include processing circuitry, one or more communication interfaces, and memory. Specifically, User Device 200 includes Processing Circuitry 210, Communication Interfaces 212, and Memory 214, Directory Server 202 includes Processing Circuitry 220, Communication Interfaces 222, and Memory 224, Secure Server 204 includes Processing Circuitry 240, Communication Interfaces 242, and Memory 244, and DHCP Server 205 includes Processing Circuitry 250, Communication Interfaces 252, and Memory 254. Processing Circuitry 210, 220, 240, and 250 may, for example, each include or consist of one or more microprocessors or the like. Communication Interfaces 212, 222, 242, and 252 may, for example, each include or consist of one or more network interface cards (NICs) or the like. And Memory 214, Memory 224, Memory 244, and Memory 254 may each include or consist of any specific type of volatile or non-volatile semiconductor memory or the like that is operable to store programs (e.g. sequences of instructions) and/or data (e.g. program state information, input data, output data, etc.) for use in the respective one of User Device 200, Directory Server 202, Secure Server 204, or DHCP Server 205.

In the illustrative embodiment of FIG. 2, the Memory 214 of User Device 200 stores program code for execution on the Processing Circuitry 210, shown for purposes of illustration by User Agent 216. User Agent 216 is an example of software that acts on behalf of a user of User Device 200, and that acts as a client entity when communicating with Secure Server 204, DHCP Server 205, and/or Directory Server 202. User Agent 216 may, for example, be embodied as a Web browser program or some other specific type of client software. User Agent 216 is further shown including Certificate Pinning Logic 218. During operation of the illustrative embodiment shown in FIG. 2, execution of Certificate Pinning Logic 218 causes the Processing Circuitry 210 in User Device 200 to perform, in whole or in part, the various operations described herein as being performed by and/or within a user device, e.g. the operations described above as being performed by or within the User Device 100 shown in FIG. 1. Certificate Store 220 is a data store (e.g. a database or the like) that may be used to store one or more sets of public key certificates for one or more servers, as received from DHCP Server 205. For example, Certificate Store 220 may be used to store a set of public key certificates for Secure Server 204. The set of public key certificates for Secure Server 204 may, for example, be stored in association with a domain name corresponding to Secure Server 204, such as a domain name of a MDM server executing on Secure Server 204.

User Agent 216 is further shown including Directory Server Public Key Certificate 217. Directory Server Public Key Certificate 217 is a public key certificate of the Directory Server 202 that is embedded (i.e. hard-coded) in User Agent 216. User Agent 216 uses the public key from Directory Server Public Key Certificate 217 to validate public key certificates for Secure Server 204 that are received from DHCP Server 205. Since the Directory Server Public Key Certificate 217 is embedded into User Agent 216, it cannot be modified in response to actions of the user of User Device 200, e.g. in response to a malicious phishing attack or the like. In order to modify Directory Server Public Key Certificate 21, e.g. when the public key of Directory Server 202 changes, a new version of User Agent 216 must be loaded into User Device 200 that contains a new public key certificate of Directory Service 202 embedded therein. Memory 214 may further be used to store a copy of one or more current server public key certificates, as received from Secure Server 204. For example, Memory 214 may be used to store a copy of Current Public Key Certificate 248 of Secure Server 204 as transmitted to User Device 200 from Secure Server 204.

As also shown in the illustrative embodiment of FIG. 2, the Memory 254 of DHCP Server 205 stores program code for execution on the Processing Circuitry 250, shown for purposes of illustration by DHCP Server Logic 256. During operation of the illustrative embodiment shown in FIG. 2, execution of DHCP Server Logic 256 causes the Processing Circuitry 250 in DHCP Server 205 to perform, in whole or in part, the various operations described herein as being performed by and/or within a DHCP server located in a secure network, e.g. the operations described above as being performed by or within the DHCP Server 105 shown in FIG. 1. DHCP Server Logic 256 is an example of software that operates to receive a set of public key certificates for Secure Server 204 from Directory Server 202, and that provides the set of public key certificates for Secure Server 204 to user devices (e.g. User Device 200) that are communicably connected to a secure network to which DHCP Server 205 is also communicably connected. See for example Secure Network 106 in FIG. 1. The DHCP Server 205 is further shown including a Certificate Set Database 300. The Certificate Set Database 300 may be used by DHCP Server Logic 256 to store sets of public key certificates for one or more servers that are communicably connected to the secure network to which DHCP Server 205 and User Device 200 are both communicably connected (e.g. Secure Network 106). In one embodiment, Certificate Set Database 300 stores a set of public key certificates for each one of multiple servers located on the secure network, including a set of public key certificates for Secure Server 204. Certificate Set Database 300 may store each set of public key certificates that it contains in association with a corresponding domain name, such that a set of public key certificates for a given server can be retrieved from Certificate Set Database 300 based on a domain name corresponding to that server. For example, the set of public key certificates for Secure Server 204 stored in Certificate Set Database 300 may be retrieved from Certificate Set Database 300 based on a domain name corresponding to Secure Server 204, e.g. a domain name identifying an application, such as an MDM server, that is hosted by Secure Server 204.

As also shown in the illustrative embodiment of FIG. 2, the Memory 224 of Directory Server 202 stores program code for execution on the Processing Circuitry 220, shown for purposes of illustration by Directory Service Logic 230. During operation of the illustrative embodiment shown in FIG. 2, execution of Directory Service Logic 230 causes the Processing Circuitry 220 in Directory Server 202 to perform, in whole or in part, the various operations described herein as being performed by and/or within a directory service communicably connected to a network that is external to the secure network to which Secure Server 204, DHCP Server 205, and User Device 200 are communicably connected, e.g. the operations described above as being performed by or within the Directory Service 102 shown in FIG. 1. Directory Service Logic 230 is an example of software that provides a set of public key certificates for Secure Server 204 to DHCP Server 205. Directory Service Logic 230 may generally be used by user devices to obtain sets of public key certificates for various servers during certificate pinning operations, including public key certificates for Secure Server 204 and servers other than Secure Server 204, except in various situations in which Directory Server 202 cannot be used to obtain a set of public key certificates for a specific server, such as situations in which User Device 200 cannot access Directory Server 202 during a certificate pinning operation with regard to Secure Server 204, and/or in situations in which an organization that controls Secure Server 204 and the secure network to which Secure Server 204 is communicably connected does not permit public key certificates for its internal servers to be stored outside of the organization's secure network, e.g. outside of Secure Network 106 as shown in FIG. 1. The Directory Server 202 is further shown including a Certificate Set Database 234. The Certificate Set Database 234 may be used by Directory Service Logic 230 to store sets of public key certificates for various servers that are located on various specific networks, including servers that are communicably connected to the secure network to which DHCP Server 205 and User Device 200 are both communicably connected (e.g. Secure Network 106), and/or other servers that are located on other networks that are external to the secure network (e.g. Remote Network 108 in FIG. 1). Certificate Set Database 234 may store each set of public key certificates that it contains in association with a corresponding domain name, such that a set of public key certificates for a given server can be retrieved from Certificate Set Database 300 based on a domain name corresponding to that server. For example, the set of public key certificates for Secure Server 204 stored in Certificate Set Database 234 may be retrieved from Certificate Set Database 234 based on a domain name corresponding to Secure Server 204, e.g. a domain name identifying an application, such as an MDM server, that is hosted by Secure Server 204.

Those skilled in the art will recognize that while in the example of FIG. 2 Directory Server 202 is shown for purposes of illustration as a physical server computer system, the disclosed technology is not so limited, Directory Server 202 may alternatively be embodied as one or more virtual private servers (VPSs), such as cloud servers or the like.

As also shown in the illustrative embodiment of FIG. 2, the Memory 244 of Secure Server 204 stores program code for execution on the Processing Circuitry 240, shown for purposes of illustration by Application Server Logic 246. Application Server Logic 246 is an example of application server software which may, for example, include MDM server logic. During operation of the illustrative embodiment shown in FIG. 2, execution of Application Server Logic 246 causes the Processing Circuitry 240 in Secure Server 204 to perform, in whole or in part, the various operations described herein as being performed by and/or within a secure server communicably connected to a secure network to which DHCP Server 205 and User Device 200 are also communicably connected, e.g. the operations described above as being performed by or within the Secure Server 104 shown in FIG. 1. Application Server Logic 246 further provides a current public key certificate of Secure Server 204, shown for purposes of illustration by Current Public Key Certificate 248, to User Device 200, in response to receipt of a request for a current public key certificate of Secure Server 204 from User Device 200.

Those skilled in the art will further recognize that while certain examples of program logic are shown in FIG. 2 for purposes of illustration and explanation with regard to each of Secure Server 204, User Device 200, DHCP Server 205 and Directory Server 202, other specific program code or logic may also be present in each of Memory 244, Memory 214, Memory 254, and/or Memory 224. Such additional software may, for example, include operating system, middleware, and/or application program code.

Figure 3:
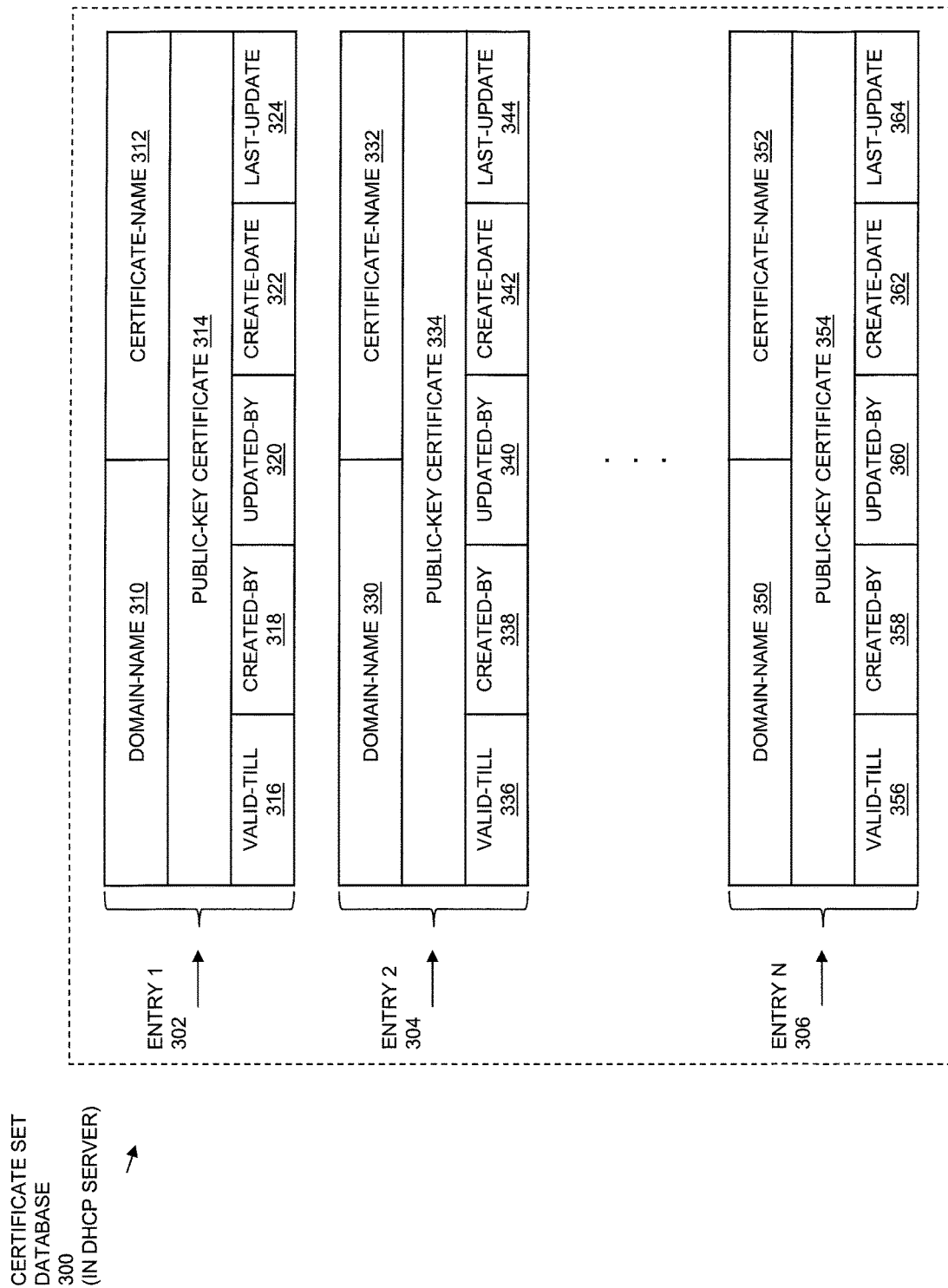
FIG. 3 is a block diagram showing an example of the structure of a certificate set database in some embodiments.

FIG. 3 is a block diagram showing an illustrative example of the structure of the Certificate Set Database 300 in some embodiments. As shown in FIG. 3, Certificate Set Database 300 includes a number of entries, shown by Entry 1 302, Entry 2 304, and so on through Entry N 306. Each of the entries in Certificate Set Database 300 includes a set of at least one public key certificate for a corresponding server, and is associated with a domain name corresponding to that server. For example, Entry 1 302 contains a Public-Key Certificate 314 for a server corresponding to Domain-Name 310, Entry 2 304 contains a Public-Key Certificate 334 for a server corresponding to Domain-Name 330, and so on through Entry N 306, which contains a Public-Key Certificate 354 for a server corresponding to Domain-Name 350. Accordingly, in order to retrieve a set of public key certificates for a given server, a request may be issued to Certificate Set Database 300 indicating the domain name corresponding to that server. Certificate Set Database 300 would then return the set of public key certificates contained in the entry for that domain name. For example, to retrieve the set of public key certificates for a server corresponding to Domain-Name 310, a request would be issued to Certificate Set Database 300 for the set of public key certificates corresponding to Domain-Name 310, and the result of the request would return Public Key Certificate 314. Similarly, in another example, to retrieve the set of public key certificates for a server corresponding to Domain-Name 330, a request would be issued to Certificate Set Database 300 for the set of public key certificates corresponding to Domain-Name 330, and the result of the request would return Public Key Certificate 334.

As also shown in the illustrative embodiment of FIG. 3, each entry in the Certificate Set Database 300 may also include other attributes of the public key certificate that it contains. For example, each entry may include a name of the public key certificate, shown by Certificate-Name 312 in Entry 1 302, Certificate-Name 332 in Entry 2 304, and so on through Certificate-Name 352 in Entry N 306.

In another example, each entry may include a date until which the public key certificate is valid, shown by Valid-Till 316 in Entry 1 302, Valid-Till 336 in Entry 2 304, and so on through Valid-Till 356 in Entry N 306.

In another example, each entry may include an identifier of a user, device, or process that created the public key certificate, shown by Created-By 318 in Entry 1 302, Created-By 338 in Entry 2 304, and so on through Created-By 358 in Entry N 306.

In another example, each entry may include an identifier of a user, device, or process that last updated the public key certificate, shown by Updated-By 320 in Entry 1 302, Updated-By 340 in Entry 2 304, and so on through Updated-By 360 in Entry N 306.

In another example, each entry may include a date indicating when the public key certificate was created, shown by Create-Date 322 in Entry 1 302, Create-Date 342 in Entry 2 304, and so on through Create-Date 362 in Entry N 306.

In another example, each entry may include a date indicating when the public key certificate was last updated, shown by Last-Update 324 in Entry 1 302, Last-Update 344 in Entry 2 304, and so on through Last-Update 364 in Entry N 306.

The specific format and attributes of the entries shown in Certificate Set Database 300 are only given as examples, for purposes of explanation. Those skilled in the art will recognize that the disclosed technology may alternatively be embodied using other entry formats, without one or more of the specific entry attributes shown in FIG. 3, and/or with one or more entry attributes other than the attributes shown in FIG. 3.

While in the example of FIG. 3 each entry in Certificate Set Database 300 is shown including a single public key certificate, the disclosed technology is not limited to such a configuration. Alternatively, individual entries may include different sized sets of public key certificates that are made up varying specific numbers of public key certificates. In another example, a set of multiple public key certificates for a given server may be stored in Certificate Set Database 300 across multiple entries, e.g. where each of the multiple entries includes a single public key certificate in the set and is associated with a domain name corresponding to the given server.

In some embodiments, the Certificate Set Database 234 may have a structure that, in whole or in part, matches the example of the Certificate Set Database 300 shown in FIG. 3.

Figure 4:
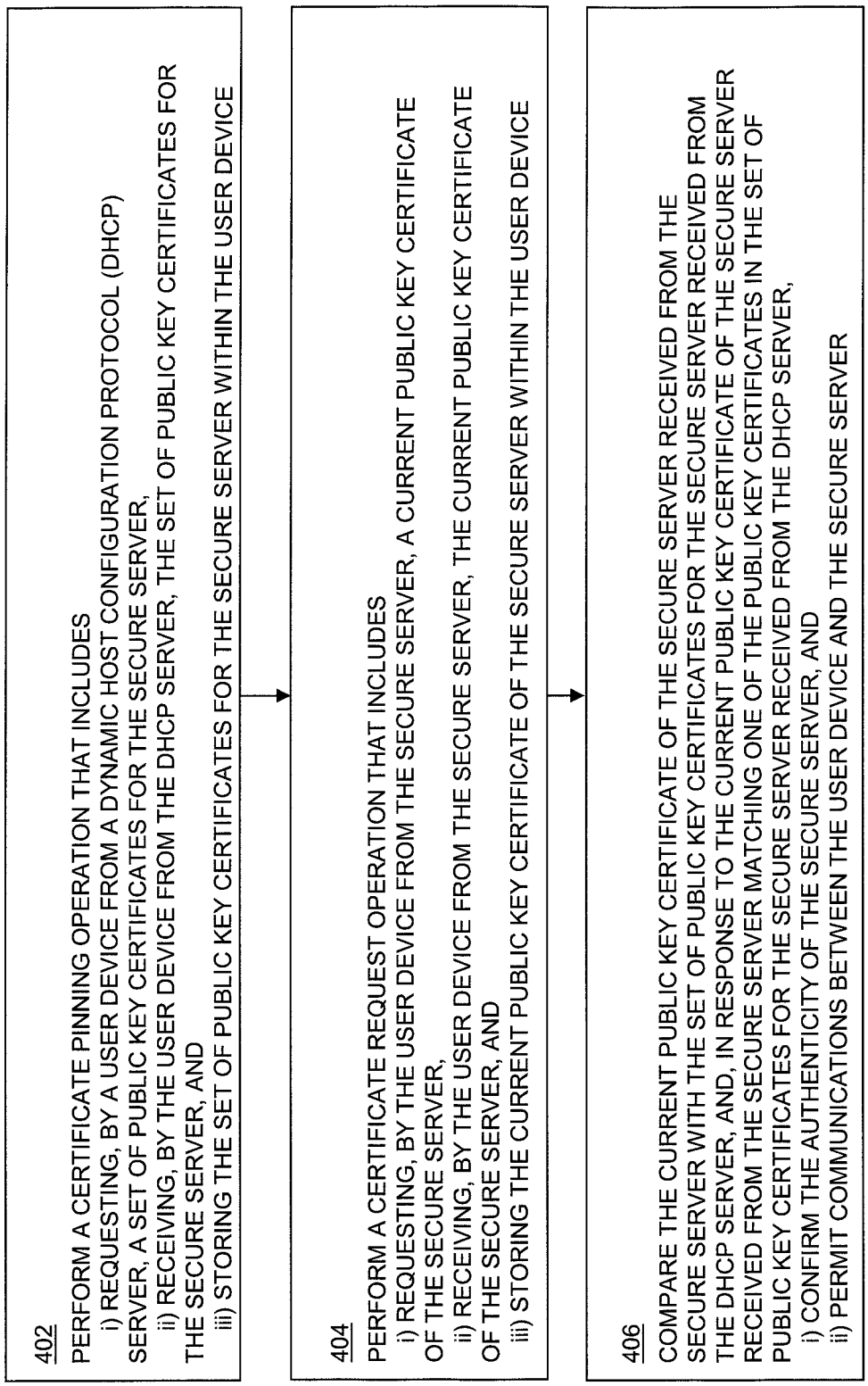
FIG. 4 is a flow chart showing an example of steps performed in some embodiments.

FIG. 4 is a flow chart showing an example of steps performed during operation of some embodiments of the disclosed technology. As shown in FIG. 4, at step 402 a certificate pinning operation is performed that includes i) requesting, by a user device from a Dynamic Host Configuration Protocol (DHCP) server, a set of public key certificates for the secure server, ii) receiving, by the user device from the DHCP server, the set of public key certificates for the secure server, and iii) storing the set of public key certificates for the secure server within the user device. At step 404 a certificate request operation is performed that includes i) requesting, by the user device from the secure server, a current public key certificate of the secure server, ii) receiving, by the user device from the secure server, the current public key certificate of the secure server, and iii) storing the current public key certificate of the secure server within the user device.

At step 406 the current public key certificate of the secure server received from the secure server is compared with the set of public key certificates for the secure server received from the DHCP server, and, in response to the current public key certificate of the secure server received from the secure server matching one of the public key certificates in the set of public key certificates for the secure server received from the DHCP server, i) the authenticity of the secure server is confirmed, and ii) communications are permitted between the user device and the secure server.

Figure 5:
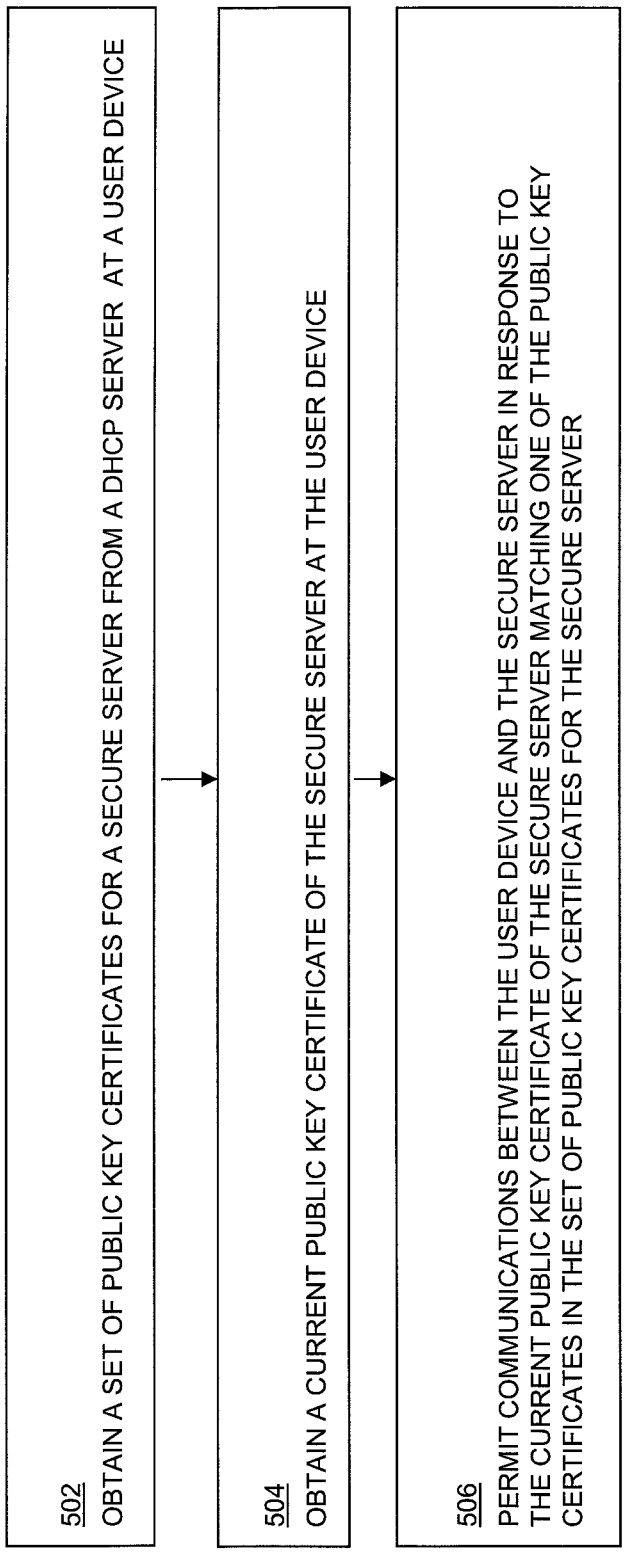
FIG. 5 is a flow chart showing another example of steps performed in some embodiments.

FIG. 5 is a flow chart showing another example of steps performed during operation of some embodiments of the disclosed technology. At step 502, a set of public key certificates for a secure server is obtained at a user device from a DHCP server. At step 504, a current public key certificate of the secure server is obtained at the user device. At step 506, communications are permitted between the user device and the secure server in response to the current public key certificate of the secure server matching one of the public key certificates in the set of public key certificates for the secure server.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

For example, while the description above refers to public key certificates conforming to the format specified by the X.509 standard for public key infrastructure (PKI), the disclosed technologies are not limited to that specific type of public key certificate, and may be embodied alternatively using public key certificates based on other formats.

Aspects of the technologies disclosed herein may be embodied as a system, method or computer program product. Accordingly, elements described herein may be embodied using hardware, software (including firmware, resident software, micro-code, etc.) or a combination of software and hardware. Furthermore, aspects of the embodiments illustrated herein may take the form of a computer program product embodied at least in part in one or more non-transitory computer readable storage medium(s) having computer readable program code stored thereon for causing one or more processors and/or a computer system to carry out those aspects.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

It will be understood by those of ordinary skill in the art that modification to and variation of the illustrated embodiments may be made without departing from the inventive concepts described herein.

What is claimed is:

1. A computer-implemented method for providing secure communications between a user device and a secure server, comprising:
    performing a certificate pinning operation by
    i) requesting, by the user device from a dynamic host configuration protocol (DHCP) server, a set of public key certificates for the secure server, wherein requesting the set of public key certificates for the secure server from the DHCP server comprises sending a request message, from the user device to the DHCP server, the request message requesting both i) the set of public key certificates for the secure server, and ii) an internet protocol (IP) address for use by the user device,
    ii) receiving, by the user device from the DHCP server, the set of public key certificates for the secure server, wherein receiving the set of public key certificates for the secure server comprises receiving, by the user device from the DHCP server, a message containing both i) an IP address assigned to the user device by the DHCP server, and ii) the set of public key certificates for the secure server, and
    iii) storing the set of public key certificates for the secure server received from the DHCP server within the user device in association with the secure server;
    performing a certificate request operation by i) requesting, by the user device from the secure server, a current public key certificate of the secure server, ii) receiving, by the user device from the secure server, the current public key certificate of the secure server, and iii) storing the current public key certificate of the secure server within the user device; and
    comparing the current public key certificate of the secure server received from the secure server with the set of public key certificates for the secure server received from the DHCP server, and, in response to the current public key certificate of the secure server received from the secure server matching one of the public key certificates in the set of public key certificates for the secure server received from the DHCP server, i) confirming the authenticity of the secure server and ii) permitting communications between the user device and the secure server.

2. The method of claim 1, wherein performing the certificate pinning operation further comprises detecting, by the user device prior to requesting the set of public key certificates for the secure server from the DHCP server, that the set of public key certificates for the secure server is not available from a directory service that stores multiple sets of public key certificates, wherein the directory service is separate and independent from the DHCP server; and
    wherein the user device requests the set of public key certificates for the secure server from the DHCP server in response to detecting that the set of public key certificates for the secure server is not available from the directory service.

3. The method of claim 1 wherein the request message sent from the user device to the DHCP server comprises a DHCP discover message;
    wherein the message received by the user device from the DHCP server that contains both i) the IP address assigned to the user device by the DHCP server and ii) the set of public key certificates for the secure server comprises a DHCP offer message; and
    wherein the user device extracts the IP address assigned to the user device by the DHCP server and the set of public key certificates for the secure server from the DHCP offer message.

4. The method of claim 1 wherein the request message sent from the user device to the DHCP server comprises a DHCP request message;
    wherein the message received by the user device from the DHCP server that contains both i) the IP address assigned to the user device by the DHCP server and ii) the set of public key certificates for the secure server comprises a DHCP acknowledge message; and
    wherein the user device extracts the IP address assigned to the user device by the DHCP server and the set of public key certificates for the secure server from the DHCP acknowledge message.

5. The method of claim 1, further comprising:
    initially performing the certificate pinning operation by the user device prior to communicating with the secure server, to obtain an initial set of public key certificates for the secure server;
    initially performing the certificate request operation by the user device in response to completion of the initial certificate pinning operation, to obtain a first current public key certificate of the secure server; and
    preventing subsequent communications between the user device and the secure server unless the first current public key certificate received from the secure server matches one of the public key certificates in the initial set of public key certificates for the secure server received from the DHCP server, by preventing establishment of a secure connection between the user device and the secure server.

6. The method of claim 1 wherein the user device comprises a mobile device;
    wherein the secure server comprises a mobile device management system;
    wherein the mobile device management system is under control of an organization having at least one protected resource;

wherein the communications between the user device and the secure server comprise enrolling the user device with the mobile device management system; and wherein enrolling the user device with the mobile device management system causes the user device to be managed by the mobile device management system and enables the user device to access the at least one protected resource of the organization.

7. The method of claim 2, wherein the user device is prevented from communicating with the directory service during an enrollment operation that enrolls the user device with a mobile device management system executing in the secure server;

wherein performing the enrollment operation causes the user device to be managed by the mobile device management system and enables the user device to access the at least one protected resource of the organization; and wherein detecting that the set of public key certificates for the secure server is not available from the directory service comprises determining that the user device cannot currently communicate with the directory service during the enrollment operation.

8. The method of claim 2, wherein detecting that the set of public key certificates for the secure server is not available from the directory service that stores multiple sets of public key certificates further comprises:

sending a request for the public key certificates for the secure server from the user device to the directory service, wherein the request for the public key certificates for the secure server sent to the directory service includes a domain name associated with the secure server; and receiving a response, by the user device from the directory service, the response indicating that the directory service does not store the set of public key certificates for the domain name associated with the secure server.

9. The method of claim 2, wherein detecting that the set of public key certificates for the secure server is not available from the directory service further comprises determining that the user device cannot currently communicate with the directory service.

10. The method of claim 2, further comprising preventing subsequent communications between the user device and the secure server in response to detecting that the current public key certificate received from the secure server does not match any of the public key certificates in the set of public key certificates for the secure server received from the DHCP server.

11. The method of claim 5, further comprising:

receiving, by the DHCP server, the set of public key certificates for the secure server from the directory service;

wherein the set of public key certificates for the secure server includes a digital signature generated by the directory service using a private key of the directory service;

wherein the user device includes a user agent having a public key of the directory service embedded therein; and wherein the user device uses the public key of the directory service embedded in the user agent to validate the set of public key certificates for the secure server when the set of public key certificates for the secure server is received by the user device from the DHCP server, based on the digital signature included in the set of public key certificates for the secure server.

12. A user device operable to provide secure communications between the user device and a secure server, comprising:

processing circuitry; and memory storing program code that, when executed by the processing circuitry, causes the processing circuitry to:

perform a certificate pinning operation by i) requesting, by the user device from a dynamic host configuration protocol (DHCP) server, a set of public key certificates for the secure server, wherein requesting the set of public key certificates for the secure server from the DHCP server comprises sending a request message, from the user device to the DHCP server, the request message requesting both i) the set of public key certificates for the secure server, and ii) an internet protocol (IP) address for use by the user device, ii) receiving, by the user device from the DHCP server, the set of public key certificates for the secure server, wherein receiving the set of public key certificates for the secure server comprises receiving, by the user device from the DHCP server, a message containing both i) an IP address assigned to the user device by the DHCP server, and ii) the set of public key certificates for the secure server, and iii) storing the set of public key certificates for the secure server received from the DHCP server within the user device in association with the secure server, perform a certificate request operation by i) requesting, by the user device from the secure server, a current public key certificate of the secure server, ii) receiving, by the user device from the secure server, the current public key certificate of the secure server, and iii) storing the current public key certificate of the secure server within the user device, and compare the current public key certificate of the secure server received from the secure server with the set of public key certificates for the secure server received from the DHCP server, and in response to the current public key certificate of the secure server received from the secure server matching one of the public key certificates in the set of public key certificates for the secure server received from the DHCP server, i) confirm the authenticity of the secure server and ii) permit communications between the user device and the secure server.

13. The user device of claim 12, wherein the program code, when executed by the processing circuitry, further causes the processing circuitry to:

perform the certificate pinning operation by detecting, prior to requesting the set of public key certificates for the secure server from the DHCP server, that the set of public key certificates for the secure server is not available from a directory service that stores multiple sets of public key certificates, wherein the directory service is separate and independent from the DHCP server; and request the set of public key certificates for the secure server from the DHCP server in response to detecting that the set of public key certificates for the secure server is not available from the directory service.

14. The user device of claim 12 wherein the request message sent from the user device to the DHCP server comprises a DHCP discover message;

wherein the message received by the user device from the DHCP server that contains both i) the IP address assigned to the user device by the DHCP server and ii) the set of public key certificates for the secure server comprises a DHCP offer message; and wherein the user device extracts the IP address assigned to the user device by the DHCP server and the set of public key certificates for the secure server from the DHCP offer message.

15. The user device of claim 12 wherein the request message sent from the user device to the DHCP server comprises a DHCP request message;
wherein the message received by the user device from the DHCP server that contains both i) the IP address assigned to the user device by the DHCP server and ii) the set of public key certificates for the secure server comprises a DHCP acknowledge message; and
wherein the user device extracts the IP address assigned to the user device by the DHCP server and the set of public key certificates for the secure server from the DHCP acknowledge message.

16. The user device of claim 12, wherein the program code, when executed by the processing circuitry, further causes the processing circuitry to:
initially perform the certificate pinning operation by the user device prior to communicating with the secure server, to obtain an initial set of public key certificates for the secure server;
initially perform the certificate request operation by the user device in response to completion of the initial certificate pinning operation, to obtain a first current public key certificate of the secure server; and
prevent subsequent communications between the user device and the secure server unless the first current public key certificate received from the secure server matches one of the public key certificates in the initial set of public key certificates for the secure server received from the DHCP server, by preventing establishment of a secure connection between the user device and the secure server.

17. The user device of claim 12, further comprising:
wherein the user device comprises a mobile device;
wherein the communications permitted between the user device and the secure server comprise an enrollment operation that enrolls the user device with a mobile device management system executing in the secure server; and
wherein enrollment of the user device with the mobile device management system causes the user device to be managed by the mobile device management system and enables the user device to access at least one protected resource.

18. The user device of claim 13, wherein the program code, when executed by the processing circuitry, in order to detect that the set of public key certificates for the secure server is not available from the directory service that stores multiple sets of public key certificates, further causes the processing circuitry to:
send a request for the public key certificates for the secure server from the user device to the directory service, wherein the request for the public key certificates for the secure server sent to the directory service includes a domain name associated with the secure server; and
receive a response from the directory service, the response indicating that the directory service does not store the set of public key certificates for the domain name associated with the secure server.

19. The user device of claim 13, wherein the program code, when executed by the processing circuitry, in order to detect that the set of public key certificates for the secure server is not available from the directory service that stores multiple sets of public key certificates, further causes the processing circuitry to determine that the user device cannot currently communicate with the directory service.

20. The user device of claim 13, wherein the program code, when executed by the processing circuitry, further causes the processing circuitry to prevent subsequent communications between the user device and the secure server in response to detecting that the current public key certificate received from the secure server does not match any of the public key certificates in the set of public key certificates for the secure server received from the DHCP server.

21. The user device of claim 16, further comprising:
wherein the set of public key certificates for the secure server includes a digital signature generated by the directory service using a private key of the directory service;
wherein the program code includes a user agent having a public key of the directory service embedded therein; and
wherein the program code, when executed by the processing circuitry, further causes the processing circuitry to use the public key of the directory service embedded in the user agent to validate the set of public key certificates for the secure server when the set of public key certificates for the secure server is received from the DHCP server, based on the digital signature included in the set of public key certificates for the secure server.

22. A non-transitory computer readable medium storing program code for providing secure communications between a user device and a secure server, wherein the program code, when executed by at least one processor, causes the processor to perform a method of:
performing a certificate pinning operation by
i) requesting, by the user device from a dynamic host configuration protocol (DHCP) server, a set of public key certificates for the secure server, wherein requesting the set of public key certificates for the secure server from the DHCP server comprises sending a request message, from the user device to the DHCP server, the request message requesting both i) the set of public key certificates for the secure server, and ii) an internet protocol (IP) address for use by the user device,
ii) receiving, by the user device from the DHCP server, the set of public key certificates for the secure server, wherein receiving the set of public key certificates for the secure server comprises receiving, by the user device from the DHCP server, a message containing both i) an IP address assigned to the user device by the DHCP server, and ii) the set of public key certificates for the secure server, and
iii) storing the set of public key certificates for the secure server received from the DHCP server within the user device in association with the secure server;
performing a certificate request operation by i) requesting, by the user device from the secure server, a current public key certificate of the secure server, ii) receiving, by the user device from the secure server, the current public key certificate of the secure server, and iii) storing the current public key certificate of the secure server within the user device; and
comparing the current public key certificate of the secure server received from the secure server with the set of public key certificates for the secure server received from the DHCP server, and, in response to the current public key certificate of the secure server received from the secure server matching one of the public key certificates in the set of public key certificates for the secure server received from the DHCP server, i) confirming the authenticity of the secure server and ii) permitting communications between the user device and the secure server.

\* \* \* \* \*